(12) United States Patent
Arenberg

(10) Patent No.: US 10,883,756 B1
(45) Date of Patent: Jan. 5, 2021

(54) RESTRAINT AND PROTECTION OF DELICATE SYSTEMS SUBJECTED TO POTENTIALLY DESTRUCTIVE FORCES

(71) Applicant: Northrop Grumman Systems Corporation, Falls Church, VA (US)

(72) Inventor: Jonathan W. Arenberg, Santa Monica, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 16/580,283

(22) Filed: Sep. 24, 2019

Related U.S. Application Data

(62) Division of application No. 15/368,828, filed on Dec. 5, 2016, now Pat. No. 10,502,476.

(51) Int. Cl.
| | | |
|---|---|---|
| *F25D 19/00* | (2006.01) | |
| *F25D 3/10* | (2006.01) | |
| *B64G 1/40* | (2006.01) | |
| *F25D 31/00* | (2006.01) | |
| *A23L 3/36* | (2006.01) | |
| *F25D 3/12* | (2006.01) | |

(52) U.S. Cl.
CPC ............... *F25D 19/00* (2013.01); *A23L 3/36* (2013.01); *B64G 1/401* (2013.01); *F25D 3/10* (2013.01); *F25D 3/102* (2013.01); *F25D 3/105* (2013.01); *F25D 3/107* (2013.01); *F25D 3/12* (2013.01); *F25D 31/005* (2013.01); *F25D 2400/02* (2013.01)

(58) Field of Classification Search
CPC . F25D 3/10; F25D 3/012; F25D 3/105; F25D 3/107; F25D 31/005; F25D 3/12; F25D 3/122; F25D 19/003; F25D 3/127; F25D 2400/02; B64G 1/401
See application file for complete search history.

(56) References Cited

U.S. PATENT DOCUMENTS

2007/0059201 A1\* 3/2007 Sundaram ............... A61L 2/183
422/28
2011/0308259 A1\* 12/2011 Wray .................... F16L 55/103
62/3.3

\* cited by examiner

*Primary Examiner* — Elizabeth J Martin
*Assistant Examiner* — Nael N Babaa
(74) *Attorney, Agent, or Firm* — McCracken & Gillen LLC

(57) ABSTRACT

An exemplary method protects a delicate device from potential damage from shock or vibration. A material in a liquid state is placed in contact with the delicate device. The liquid material is cooled causing it to transition to a solid state which stabilizes the delicate device in contact with the solid material against shock and vibration. The solid state material is heated causing it to sublimate into a gas thus releasing the delicate device for operation.

11 Claims, 2 Drawing Sheets

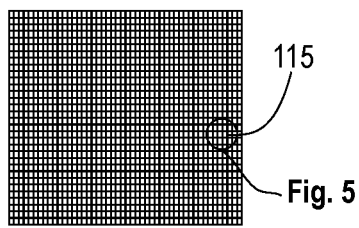
Fig. 4
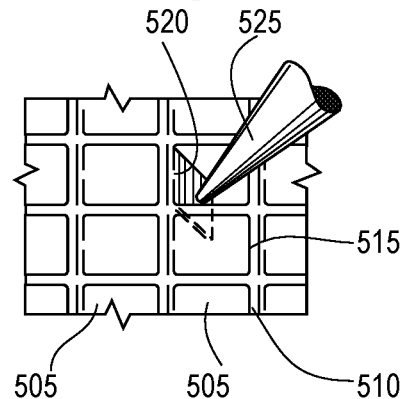
Fig. 5
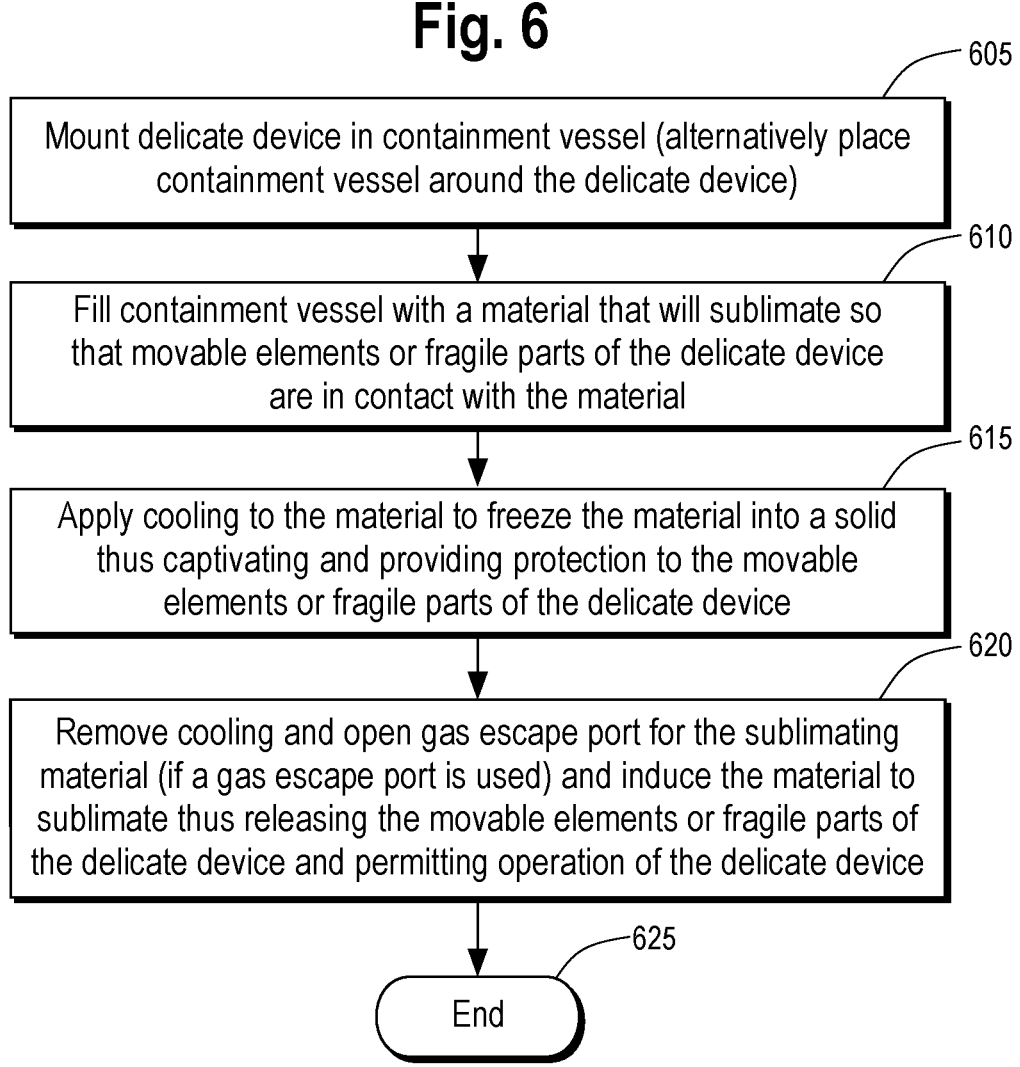

RESTRAINT AND PROTECTION OF DELICATE SYSTEMS SUBJECTED TO POTENTIALLY DESTRUCTIVE FORCES

CROSS REFERENCE TO RELATED APPLICATIONS

The present application is a divisional application of U.S. patent application Ser. No. 15/368,828, filed Dec. 5, 2016, entitled "RESTRAINT AND PROTECTION OF DELICATE SYSTEMS SUBJECTED TO POTENTIALLY DESTRUCTIVE FORCES", the entire contents of which are incorporated herein by reference.

BACKGROUND

This invention relates to protecting a delicate system during an interval of time when the system is subjected to forces that are likely to have a destructive impact on the system. It also relates to a single protection system can protect a plurality of separate fragile elements of a system.

A variety of techniques have been utilized to provide protection for delicate mechanical, electrical or optical systems against potentially destructive forces or mechanical shocks. The techniques available are dependent on the type of systems that require protection and the type of forces or shocks to be protected against. For example, various types of shock absorbing resilient material may be placed in contact with a delicate electrical system to cushion the electrical system and reduce undesired movement/acceleration transmitted to the system.

Delicate optical and mechanical systems, e.g. micro electrical mechanical systems (MEMS), are especially challenging with regard to providing protection against potentially destructive forces and/or shocks. The protection utilized must not obstruct or otherwise degrade the operation of the system during times when the system is operational. However, the protection utilized must be effective during times when the system is potentially subject to the destructive forces and/or shocks. Known protection systems such as for MEMS are an integral fixed part of the system such as by using stops/barriers to limit the amount of travel of movable elements due to unwanted shocks and may utilize active components to counteract unwanted shock induced movement. Although such techniques may be adequate for protection of structures with few moving elements, these techniques are not suitable for other types of structures having a large number of separate, individual, movable elements or very small delicate elements for which suitable protection is difficult, if not impossible, to implement. This due to the substantial additional physical structure of the protection system needed for each moving element of the system being protected which may interfere with operation of the protected system as well as incurring significant increased weight. Therefore, there exists a need for an improved restraint and protection system for delicate mechanisms, especially for those having many movable elements requiring protection.

SUMMARY

It is an object of the present invention to satisfy this need.

An exemplary method protects a delicate device from potential damage from shock or vibration. A material in a liquid state is placed in contact with the delicate device. The liquid material is cooled causing it to transition to a solid state which stabilizes the delicate device in contact with the solid material against shock and vibration. The solid state material is heated causing it to sublimate into a gas thus releasing the delicate device for operation.

An apparatus for practicing the method is another embodiment of the present invention.

DESCRIPTION OF THE DRAWINGS

Features of exemplary implementations of the invention will become apparent from the description, the claims, and the accompanying drawings in which:

FIG. 4 shows an example of a delicate device having many movable elements for which the illustrative embodiment of the invention is suited to provide shock protection.

FIG. 5 is an exploded view of a small section of the delicate device shown in FIG. 4.

FIG. 6 is a flow diagram illustrating exemplary steps in accordance with an embodiment of the present invention.

DETAILED DESCRIPTION

One aspect of the present invention resides in the recognition of the difficulties associated with providing protection against shock for delicate devices, especially such devices having very small fragile elements or devices with many separate fragile or movable elements, and that improved protection could be provided by using a material that sublimes to captivate the delicate device in a solid encasement for protection with the material exiting from the delicate device in a gaseous change of state thus releasing the delicate device for operation.

Figure 1:
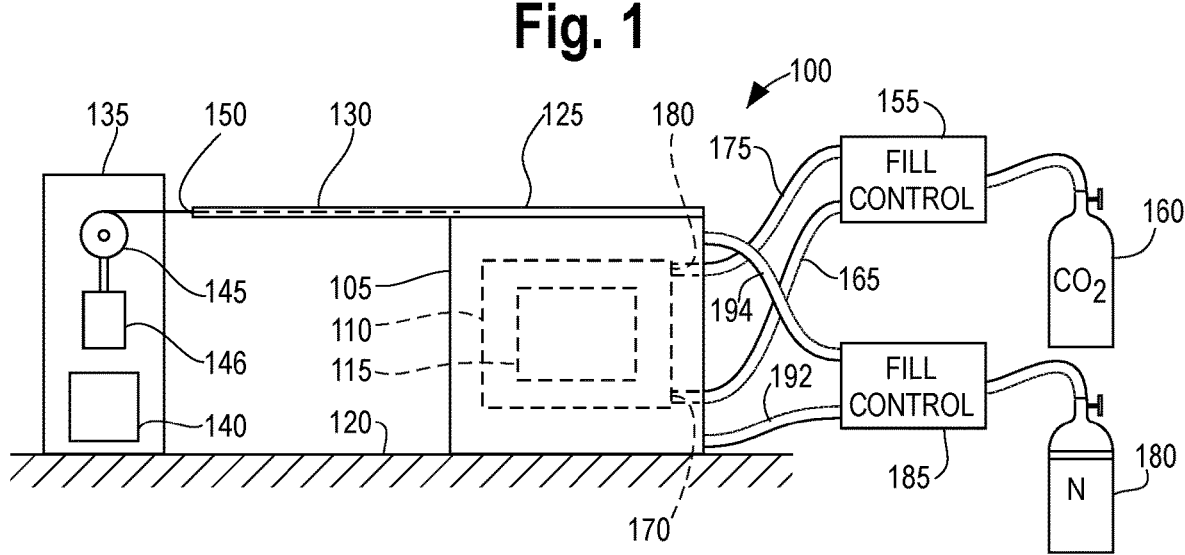
FIG. 1 is a representative side view of an exemplary embodiment in accordance with the present invention.

FIG. 1 is a representative side view of an exemplary embodiment 100 in accordance with the present invention. An outer container 105 surrounds an inner container 110 in which the delicate device 115 is mounted. As used herein, a "delicate device" refers to a mechanical, electrical or optical device having fragile and/or movable elements which would likely be adversely impaired or made inoperable upon experiencing substantial physical shock and/or vibration. The embodiments of the present invention are especially, but not exclusively, suited for protection of delicate devices having a large number, e.g. more than 20, of separate fragile and/or movable elements or otherwise difficult to secure elements. A specific example of one such delicate device is a MEMS micro shutter explained in more detail below. Another type of delicate device has a thin fragile layer or membrane such as a pellicle which can be damaged by large magnitude forces beyond which the membrane is designed to withstand. The outer container 105 is mounted to a rigid support structure 120. A top movable lid 125 of the outer container 105 is dimensioned to be latterly slid along rails 130 by control mechanism 135. An electrical control circuit 140 of control mechanism 135 controls the activation of motor 142 causing the connected wench 145 to rotate thus drawing a connected wire or rope 150 connected to the top movable lid 125 toward the control mechanism 135 causing the lid to slide along the rails leaving the top of the outer container 105 open.

A fill controller 155 is coupled to a source 160 of a material 162 that will sublime, e.g. carbon dioxide stored in liquid form. Although carbon dioxide is referred to in the following description, any material that will sublime could be utilized and is included within the scope of the present invention. An inlet hose 165 is connected to the fill controller 155 and to a port 170 near the bottom of the inner container 110. The corresponding outlet hose 175 is connected to the fill controller 155 and to a port 180 near the top of the inner container 110. The delicate device 115 is disposed within the inner container 110 relative to port 170 and 180 so that the entirety of the part of the delicate device 115 requiring protection will be submerged in the carbon dioxide when the inner container 110 is filled by the fill controller 155. The locking material flows over (in contact with) the delicate elements and is able to be frozen by cooling thus forming a solid lock that secures the delicate elements. The locking material then sublimates after removal of the refrigeration/cooling. The outlet hose 175 may be operated by the fill controller 155 to form a closed filling system or, alternatively, the outlet hose 175 may direct any excess carbon dioxide to a waste container or vent.

A fill controller 185 is coupled to a source 190 of a cooling material, e.g. liquid nitrogen. Although liquid nitrogen is referred to in the following description, any material or refrigeration system that can provide a cooling function sufficient to freeze the carbon dioxide into a solid state could be used, e.g. a high capacity thermo-electric cooling system or cryogenic cooling system. An inlet hose 192 is connected to fill controller 185 and to a port near the bottom of our container 105. A corresponding outlet hose 194 is coupled to the fill controller 185 and to a port of the outer container 105 near its top. The outlet hose 194 may be operated by the fill controller 185 to form a closed filling system or, alternatively, the outlet hose 194 may direct any excess liquid nitrogen to a waste container. The liquid nitrogen fills the space between the interior surface of the outer container 105 and the external surface of the inner container 110 for a sufficient time to change the carbon dioxide contained inside the inner container 110 to a solid state. The liquid nitrogen may continue to be stored and/or circulated within the outer container 105 as long as it is desired to maintain the carbon dioxide in a solid/frozen state. At a time when the danger from shock or vibration has ceased, liquid nitrogen may be removed from the outer container 105 under control of the fill controller 185 thereby removing the source of cooling from the inner container 110 in the carbon dioxide, now in a frozen solid state therein.

Alternatively, cooling from the liquid nitrogen may be discontinued even though the delicate device 115 will thereafter be subjected to shock or vibration as long as the carbon dioxide remains in a solid state during the time that the delicate device 115 is subjected to the shock or vibration. That is, even if the ambient temperature is rising around the inner container 110 and the carbon dioxide is beginning to sublimate, as long as sufficient carbon dioxide in a solid state remains to captivate and hold the delicate device, the fragile and/or movable features of the latter are provided protection from undesired shock or vibration. For example, if the delicate device is part of a system to be launched into outer space aboard a rocket where substantial shock or vibration will be incurred during a time interval between launch and the payload reaching orbit. The liquid nitrogen may be drained from the outer container 105 just prior to launch with the solid state frozen carbon dioxide remaining in a solid state during the critical time interval during which significant shock and/or vibration is incurred. Keeping the top lid 125 enclosing the outer container 105 will inhibit the rate of sublimation by reducing exposure of the frozen carbon dioxide to the ambient environment outside the outer container 105. The lid 125 may be slid away from the outer container 105 to open its top to enhance the rate of sublimation.

Figure 2:
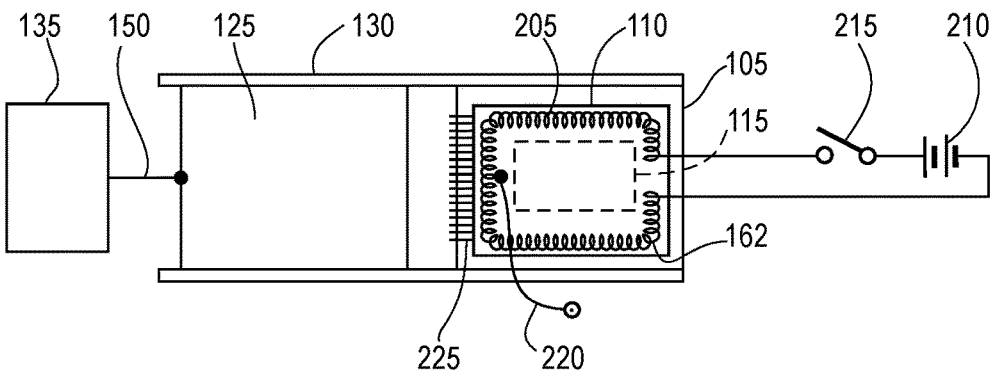
FIG. 2 is a partial top view of the embodiment of FIG. 1 shown during the stage during which restraint and protection is being provided.

FIG. 2 is a partial top view of the embodiment of FIG. 1 with the cooling system and the carbon dioxide supply system not shown. As shown, the top lid 125 of the outside container 105 has been slid laterally to the left along rails 130 to expose the open top of the inner container 110 to the external environment. A source of heat 205, e.g. an electric heating coil, is shown disposed around the interior of the inner container 110. Although the heat source 205 will be hereinafter referred to as a heating coil, it will be understood that a variety of sources of heating could be utilized to enhance and/or control the rate of sublimation of the frozen carbon dioxide 162. The heating coil 205 may be disposed at a position within the inner container 110 so as to be embedded within the frozen carbon dioxide or may be disposed just above the top surface of the frozen carbon dioxide. The choice of location of the heating coil 205 should be made in view of the rate of heat transfer to the frozen carbon dioxide that is desired which will in turn provide a primary influence on the rate of sublimation. That is, embedding the heating coil 205 within the frozen carbon dioxide will enhance the ability to more rapidly induce sublimation due to increased heat transfer. This may or may not be desired depending on the external environment and the contribution, if any, to heating of the frozen carbon dioxide by the external environment. In the illustrative heating system, a battery 210 supplies current to the heating coil 205 to induce heating. A switch 215 in series between the battery 210 and the heating coil 205 permits or inhibits the flow of current. The switch 215 may include a timer that is preset to initiate the flow of current at a time when the danger of shock and/or vibration has passed. The timer may also be set to then stop the flow of current after a predetermined time when sufficient heat will have been provided to have caused the complete sublimation of the frozen carbon dioxide. Alternatively, the switch 215 may comprise a solenoid that is remotely controlled by information supplied from an external resource, e.g. signal sent from a communication receiver disposed in a system that includes the illustrative embodiment of the present invention.

Optionally, a temperature sensor 220 may be disposed within the interior container 110 and embedded within the frozen carbon dioxide 162 to provide information that may be connected to an external control system that controls the operation of the switch 215. Such a temperature sensor provides a signal corresponding to the temperature of the frozen carbon dioxide near the delicate device 115. This information could be utilized to control the heating supplied by the heating coil 205. Communication lines 225 are used to interconnect the delicate device 115 with an external system (not shown). The communication lines 225 may convey electrical and/or optical information between the delicate device 115 and the external system.

Figure 3:
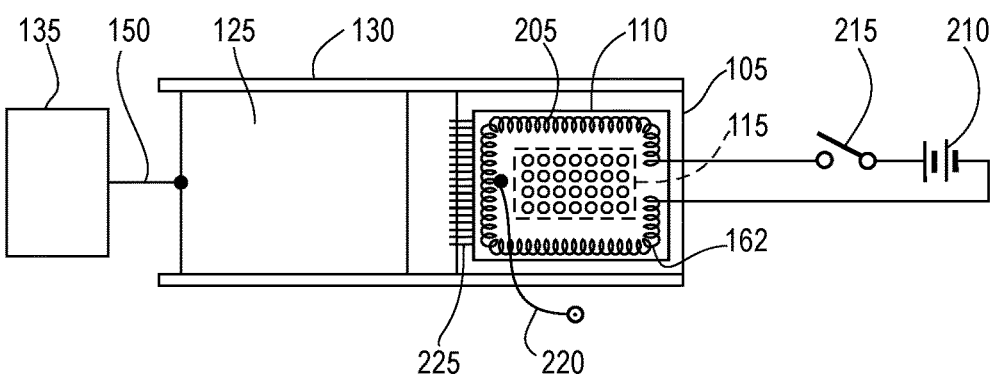
FIG. 3 is similar to FIG. 2 but shows the embodiment of FIG. 1 during an operational stage subsequent to restrain and protection having been provided.

FIG. 3 is similar to FIG. 2 but shows the embodiment subsequent to sublimation of the carbon dioxide. At this stage, the outside container 105 is open, i.e. its lid 125 has been slid to the left, and the previously frozen carbon dioxide that encapsulated the delicate device 115 has sublimated from the inner container 110 into the external environment and is no longer present in the inner container 110.

FIG. 4 shows an example of a delicate device 115 having many movable elements for which the illustrative embodiment of the invention is well suited to provide protection against shock and/or vibration. In this exemplary embodiment, the delicate device 115 comprises a MEMS micro shutter associated with a space telescope. The MEMS micro shutter consists of thousands of individually operable shutters disposed in a planar grid where each shutter is opened to allow light to pass to associated optics, e.g. a telescope, or closed to prevent light associated with the area of the shutter from reaching the associated optics. Each shutter may occupy a rectangular area being a few hundred microns on each side and have a hinge along one edge allowing the shutter to be opened or closed within its window in the planar grid. This arrangement allows a single exposure to view a plurality of selected separate locations within the field of view.

FIG. 5 is an enlarged partial view of a small section of the MEMS micro shutter assembly shown in FIG. 4. As shown in this enlarged view, a plurality of rectangular micro shutters 505 are disposed in a planar grid 510 in corresponding windows 515. Each of the micro shutters has a hinge 520 disposed along one edge as best seen in the shutter shown depressed by a stylus 525 operated by a person. The micro shutters and associated hinge mechanisms are delicate and would be subject to potential damage due to shock and vibration associated with the forces produced by a rocket launch of a space telescope and associated micro shutter mechanism into orbit. Methods of restraint for such delicate systems during a rocket launch are not believed to be available which places very challenging demands on its external environment to reduce shock forces to acceptable levels.

This exemplary MEMS device provides an example for which the embodiment of the present invention is well-suited to provide protection. That is, this delicate device has a large number of fragile elements, e.g. individually movable shutters, which are located in a structure that allows liquid carbon dioxide to come into contact with each of the elements prior to being frozen into a solid state. Preferably, each fragile element is encased by the frozen carbon dioxide, i.e. trapped to prevent movement in all the directions in which the element is designed to move. In this example, the liquid carbon dioxide would preferably flow and contact both sides of the planar grid so that both sides of each micro shutter is contacted and then secured against movement by the frozen carbon dioxide. This allows the embodiment of the present invention to provide a common, single pass, solution for protection against vibration and shock. In different types of delicate devices it may only be necessary to prevent motion in one direction and hence the frozen carbon dioxide need only engage and restrict movement in that direction. It may be desirable to fill a restricted space surrounding the delicate device, e.g. at least the part of inner container 110 containing the delicate device, with liquid/frozen carbon dioxide so that the periphery of the frozen block engages and is restricted from movement itself by fixed walls/structures. Alternatively, a structure to which the delicate device is mounted may have sufficient strength to hold the frozen carbon dioxide without additional support being required from other structures/walls abutting the periphery of the frozen carbon dioxide to stabilize the latter during shock and vibration.

FIG. 6 is a flow diagram illustrating exemplary steps in accordance with an embodiment of the present invention. In step 605 the delicate device is mounted in a containment vessel, or alternatively, the containment vessel is placed around the delicate device. In step 610 the containment vessel is filled with a material, that will sublimate, so that movable elements or fragile parts of the delicate device are in contact with the material. Preferably, the material engages sufficient surfaces of the elements/fragile parts to restrain movement of the latter due to potentially damaging forces of shock and/or vibration. In step 615 cooling is applied to the material to freeze it into a solid thus captivating and providing protection to the movable elements/fragile parts of the delicate device. In step 620 the cooling ceases and a gas escape port for the sublimating material is opened (if a gas escape port is used). The material is induced to sublimate thus releasing the movable element/fragile parts of the delicate device and thereby enabling operation of the delicate device. The material may be induced to sublimate by either exposing it to an ambient environment having a temperature warm enough to cause the frozen material to transition to its gas state or by applying an active source of heat to elevate the temperature of the frozen material sufficient for it to transition to its gas state. The method terminates at END step 625.

Although exemplary implementations of the invention have been depicted and described in detail herein, it will be apparent to those skilled in the art that various modifications, additions, substitutions, and the like can be made without departing from the spirit of the invention. For example, the sublimating material can be changed, if needed. Sublimation is a phase transition that occurs below a substance's triple point on the phase diagram and will occur where the vapor pressure is greater than the ambient temperature. Using an embodiment of the invention as a launch restraint for space, the ambient pressure during operation (in space) is essentially nil making many more materials candidates for the locking material, depending on other factors such as chemical compatibility.

The scope of the invention is defined in the following claims.

The invention claimed is:

1. A method for protecting a micro electrical mechanical system (MEMS) device from potential damage from shock or vibration comprising the steps of:
    placing a material in a liquid state in contact with the MEMS device;
    cooling the liquid material to cause the liquid material to transition to a solid state material which stabilizes the MEMS device in contact with the solid state material against shock and vibration;
    heating the solid state material causing the solid state material to sublimate into a gas thus releasing the MEMS device for operation.

2. The method of claim 1 where the potential damage from shock or vibration is encountered during a known time interval, the material being in the solid state providing protection for the MEMS device during the known time interval.

3. The method of claim 1 wherein the step of placing a material in a liquid state comprises filling a container with the liquid material where the MEMS device is within the container, the container being secured to a structure to prevent movement relative to the structure.

4. The method of claim 1 wherein the liquid material is carbon dioxide.

5. The method of claim 1 wherein the step of heating the solid state material comprises allowing the heat from the external environment to raise the temperature of the solid state material causing the solid state material to sublimate.

6. The method of claim 1 wherein the step of heating the solid state material comprises using electrical energy converted into heat that is transferred to the solid state material to raise the temperature of the solid state material causing the solid state material to sublimate.

7. The method of claim 6 wherein the electrical energy is converted into heat by a heating coil embedded within the solid state material.

8. The method of claim 1 wherein the step of cooling the liquid material comprises flowing liquid nitrogen adjacent the liquid material.

9. The method of claim 1 wherein the MEMS device includes a plurality of separated movable elements with each being susceptible to potential damage from shock or vibration, the liquid material being in contact with each of the separated movable elements so that the material in the solid state is in contact with each of the separated movable elements to provide protection against movement and potential damage to the separated movable elements.

10. The method of claim 1 where the potential damage from shock or vibration occurs due to an event encountered during a known time interval during which the material is in the solid state, the sublimation of the material occurring after expiration of the known time interval.

11. The method of claim 10 where the event is a launch of a rocket and the MEMS device is part of a payload of the rocket.

\* \* \* \* \*